(12) United States Patent
Bomgardner et al.

(10) Patent No.: US 9,424,560 B2
(45) Date of Patent: Aug. 23, 2016

(54) TIME INDICATORS FOR CALENDARS

(71) Applicant: Microsoft Corporation, Redmond, WA (US)

(72) Inventors: Jake Bomgardner, Redmond, WA (US); Christopher Jarzabek, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 13/850,258

(22) Filed: Mar. 25, 2013

(65) Prior Publication Data

US 2014/0286134 A1  Sep. 25, 2014

(51) Int. Cl.

| | | |
|---|---|---|
| *G06F 3/048* | (2013.01) | |
| *G06Q 10/10* | (2012.01) | |
| *G06F 3/0481* | (2013.01) | |
| *G06F 17/24* | (2006.01) | |

(52) U.S. Cl.
CPC ............ *G06Q 10/109* (2013.01); *G06F 3/0481* (2013.01); *G06F 17/243* (2013.01)

(58) Field of Classification Search
CPC ... G06F 3/0237; G06F 3/0481; G06F 17/243; G06F 17/276; G06F 3/0482
USPC ........................................................ 715/780
See application file for complete search history.

(56) References Cited

U.S. PATENT DOCUMENTS

| | | | |
|---|---|---|---|
| 5,899,979 A | 5/1999 | Miller et al. | |
| 6,380,953 B1 * | 4/2002 | Mizuno ............... | G06F 3/04855 715/764 |
| 7,003,737 B2 | 2/2006 | Chiu et al. | |
| 8,386,934 B2 * | 2/2013 | Takakura et al. ............. | 715/723 |
| 8,522,163 B2 * | 8/2013 | Relyea et al. .................. | 715/834 |
| 8,739,047 B1 * | 5/2014 | Holler et al. ................... | 715/759 |
| 8,799,808 B2 * | 8/2014 | Satterfield et al. ............. | 715/780 |
| 8,839,139 B2 * | 9/2014 | Leukart et al. ................ | 715/779 |
| 8,869,050 B2 * | 10/2014 | Cates et al. .................... | 715/762 |
| 2004/0100460 A1 | 5/2004 | Yamada et al. | |
| 2005/0108233 A1 | 5/2005 | Metsatahti et al. | |
| 2005/0108253 A1 | 5/2005 | Metsatahti et al. | |
| 2005/0138066 A1 | 6/2005 | Finke-Anlauff et al. | |
| 2006/0069604 A1 | 3/2006 | Leukart et al. | |
| 2007/0147178 A1 * | 6/2007 | Masuda ............ | G06F 17/30265 368/29 |
| 2008/0244425 A1 * | 10/2008 | Kikin-Gil et al. ............. | 715/764 |
| 2013/0205245 A1 * | 8/2013 | Croll et al. .................... | 715/781 |
| 2014/0365107 A1 * | 12/2014 | Dutta ................... | G01C 21/343 701/408 |

OTHER PUBLICATIONS

Bob LeVitus, OS X Mountain Lion for Dummies, Pub. Date: Aug. 14, 2012, Publisher: For Dummies, "Keeping track of Calendar"—pp. 1-6, see attached.*

Kate Binder, Easy OS X Mountain Lion, Pub. Date Feb. 2013, Publisher: Que, "Switching Calendar Views in Calendar"—pp. 1-2.*

(Continued)

*Primary Examiner* — David Phantana Angkool

(74) *Attorney, Agent, or Firm* — Damon Reith; Christopher Coy; Micky Minhas

(57) ABSTRACT

In a multiday view of a calendar, a time indicator is shown adjacent to a graphical element for the current day. In the multiday view, such a time indicator accurately indicates the current time on the current day, but not on other days of the week. If the current day is not viewable, the time indicator is not shown. By being adjacent to the graphical element for the current day, the time indicator does not obscure information, such as events, for the current day.

21 Claims, 6 Drawing Sheets

(56) References Cited

OTHER PUBLICATIONS

Bouzereau, Olivier., "Chapter 4. Views and Filters", Retrieved at <<http://docs.kde.org/stable/en/kdepim/korganizer/chapter-views-and-filters.html>>, Retrieved Date: Feb. 27, 2013, pp. 6.

"View Your Calendars & Events", Retrieved at <<http://support.google.com/calendar/bin/answer.py?hl=en&answer=2670118>>, Retrieved Date: Feb. 27, 2013, pp. 3.

"Bug 308175—Visual Indicator in Day and Week View to Show Current Time (Slot)", Retrieved at <<https://bugzilla.mozilla.org/show_bug.cgi?id=308175>>, Nov. 19, 2009, pp. 11.

"Switch Calendar Views Between 12-hour and 24-hour Clock", Retrieved at <<http://office.microsoft.com/en-in/outlook-help/switch-calendar-views-between-12-hour-and-24-hour-clock-HA001140036.aspx>>, Retrieved Date: Feb. 27, 2013, pp. 1.

Anthony, Colin., "Designing the Windows 8 Calendar App", Retrieved at <<http://blogs.msdn.com/b/b8/archive/2012/06/15/designing-the-windows-8-calendar-app.aspx>>, Jun. 16, 2012, pp. 32.

"International Search Report and Written Opinion Issued in PCT Patent Application No. PCT/US2013/056924", Mailed Date: Nov. 21, 2014, 9 Pages.

* cited by examiner

This week

| | Sun. Feb 16 | Mon. Feb 17 | Tue. Feb 18 | Wed. Feb 19 | Thu. Feb 20 | Fri. Feb 21 | Sat. Feb 22 |
|---|---|---|---|---|---|---|---|
| | | birthday | birthday | | birthday | | birthday |
| 9 | | | | | | | |
| 10 | | | Meeting Office | | | Meeting Office | |
| 11 | | | | Meeting Conf Room | Meeting Office | | |
| 12 | | | Meeting Office | | Meeting Office | Meeting Office | |
| 1 | | | | | | | |
| 2 | | | Meeting Office | | Meeting Office | | |
| 3 | | Meeting Office | 3:22 PM | Calendar Design Conf Room | Meeting Office | Meeting Office | Meeting |
| 4 | | | | | | | |
| 5 | | | | | | | |

FIG.3

TIME INDICATORS FOR CALENDARS

BACKGROUND

Many computers have calendar applications that enable a user to schedule and plan events and reminders. Each event is assigned a range of time, typically by a start day and start time and an end day and end time.

Such calendar applications generally provide several views, or graphical representations, of the calendar information. Such views often include, but are not limited to, a single day view, a multi-day view, a work week (five day, Monday to Friday) view, a full week view, and month view. A graphical representation of a calendar generally is in the form of a grid, with days of the week along a first axis and time of day along a second axis. Typically, a current day is highlighted on the first axis, and a current time is highlighted on the second axis.

SUMMARY

This Summary introduces selected concepts in a simplified form that are further described below in the Detailed Description. This Summary is intended neither to identify key or essential features of the claimed subject matter, nor to limit the scope of the claimed subject matter.

In a multiday view, or graphical representation, of a calendar, a time indicator is shown adjacent to a graphical element for the current day. In the multiday view, such a time indicator accurately indicates the current time on the current day, but not other days of the week. If the current day is not viewable, the time indicator is not shown. By being adjacent to the graphical element for the current day, the time indicator does not obscure information, such as events, for the current day. If the time indicator overlays a previous day, only information of past events may be obscured.

Accordingly, in one aspect, when a calendar is displayed, a selected range of time of two or more days is received into memory. A current day and a current time also are received. A calendar display object is generated, with a first axis representing days and a second axis representing time of day. The calendar display object is generated for a range of time including at least the selected range of time, such that each day has a graphical representation with an extent along the first axis, and ranges of time within each day have a graphical representation with an extent along the second axis. The computer determines if a current day is within the range of time included in the calendar display object. In response to a determination that the current day is within the range of time included in the calendar display object, a time indicator display object is generated. The time indicator includes a time box comprising a graphical representation of a geometric object in which a numerical representation of the current time is displayed. The time indicator display object is positioned on the calendar display object at the current time and adjacent to the current day.

The numerical representation of the current time can be limited so as to include hours and minutes, but not seconds, and can be in either standard time format or twenty-four hour format. The time indicator also can include a time bar. The time bar can be implemented using line displayed parallel with the first axis and within the extent of the graphical representation of the current day, and positioned at the current time on the second axis.

The time box can be substantially centered on the current time along the second axis. However, in one implementation, when the current time is close to a boundary of the second axis, the time box is aligned with the boundary. The time box can be displayed contiguous with an edge of the graphical representation of the current day. The time box can be displayed outside the extent of the graphical representation of the current day. The time box can be displayed substantially outside the extent of the graphical representation of the current day. The time box is sufficiently large to allow it to be easily read on the display, and selected using a pointing device or by a touch operation on a touch sensitive display, yet sufficiently small so as not to obscure too much information on the calendar.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3 is an example graphical representation of a multiday calendar view.

DETAILED DESCRIPTION

The following section provides an example operating environment in which a calendar with time indicators can be implemented.

Figure 1:
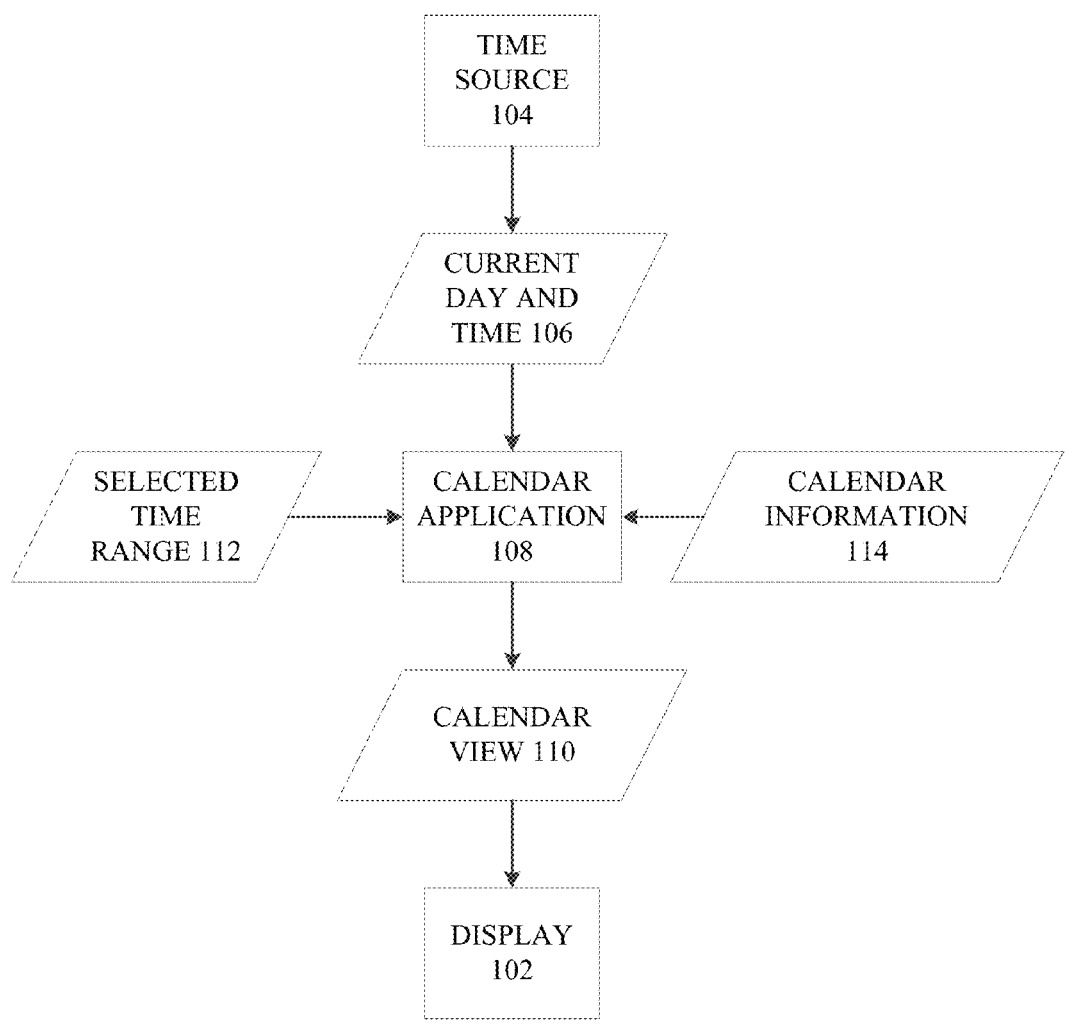
FIG. 1 is a block diagram of a computer system with a calendar application.

Referring to FIG. 1, a computing system includes a display 102 on which information is displayed. An example computer system is described in more detail below. The computer system includes a source 104 of the current time and day 106, typically available through an operating system of a computer. A calendar application 108 provides a calendar view 110 to the display 102. The calendar view 110 is generated by the calendar application 108, given the current day and time 106 from the operating system, calendar information 114 and any selected range of time 112, which can be selected by a user.

The computing system 100 includes one or more computers, such as a computer described in more detail below. The calendar information 114 can be stored on a computer separate from a computer running the calendar application 108. The calendar application 108 can be running on a computer separate from any device with the display 102. The time source 104 can be on a computer separate from the computers with the computer application 108 and display 102. Any number of computers can be interconnected by a computer network. In some cases, a user may have multiple computers, each with a calendar application 108, for accessing the calendar information 114 stored on a remote computer accessed over a computer network. Alternatively, a user may have multiple computers to access a calendar application running on a computer to which the user connects over a computer network. These are merely a few example configurations of such a computer system for supporting calendar applications.

Given this context, an example implementation of a calendar application with a time indicator display will now be described in more detail in connection with FIGS. 2-5.

Figure 2:
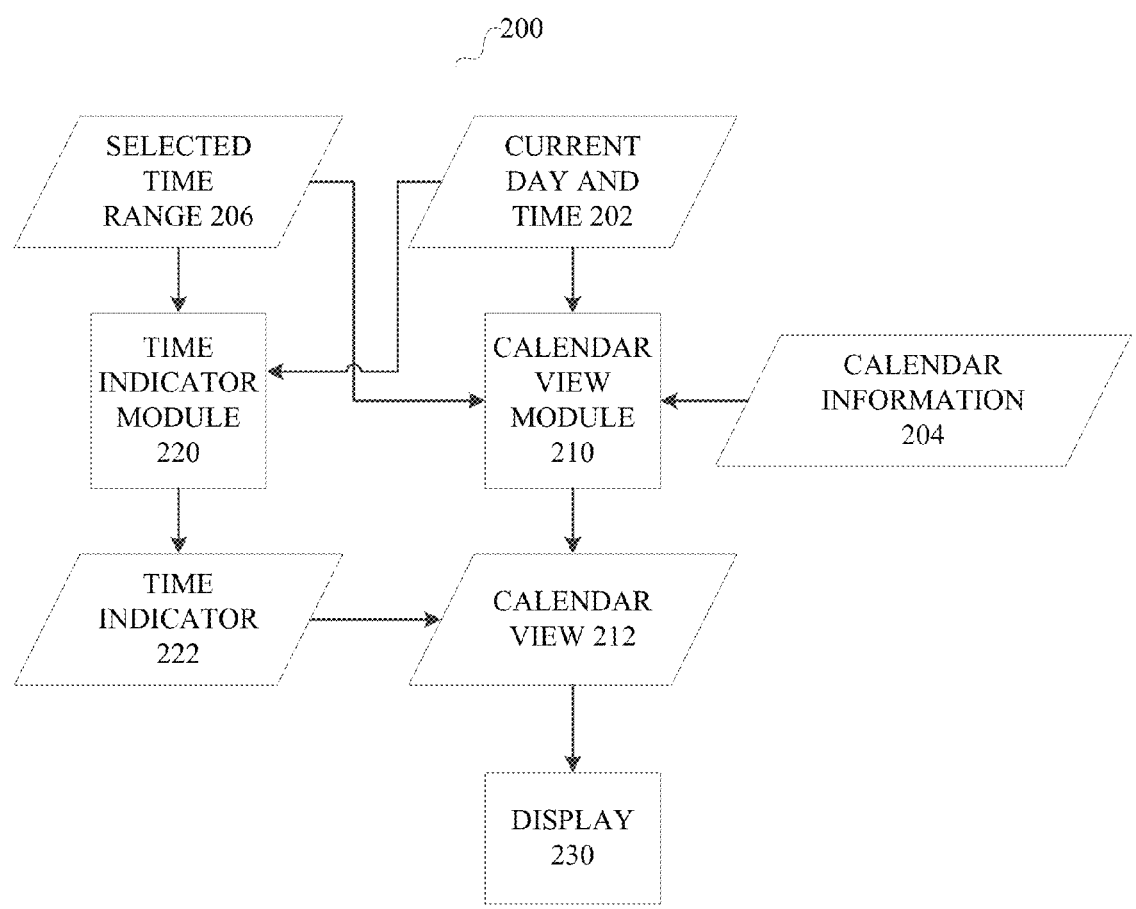
FIG. 2 is a data flow diagram illustrating an example implementation of such a calendar application.

In FIG. 2, the part of the calendar application that generates a view of a calendar, herein called calendar view module 200, will now be described.

The calendar view module 200 receives an indication of a current day and time 202, calendar information 204 and a selected range of time 206. The selected range of time typically is selected by the user, but may be selected by the computer. The selected range of time can be, for example, a single day view, a multi-day view, a work week (five day, Monday to Friday) view, a full week view, and month view. For the purposes of explaining the use of a time indicator, multi-day views will be discussed herein. The data is received into a memory of a computer for processing by the calendar application running on a processor of the computer.

The calendar view module includes a calendar module 210 that generates a calendar display object 212 using the calendar information. An example calendar display object is described in more detail below. As an example, the calendar display object generally has a first axis representing days and a second axis representing time of day. This display object is generated for a range of time including at least the selected range of time. As a result, each day has a graphical representation with an extent along the first axis. Ranges of time within each day have a graphical representation with an extent along the second axis.

The calendar view module also includes a time indicator module 220 that receives the current day and time and the selected range of time, and generates and outputs a time indicator display object 222. An example time indicator display object is described in more detail below. In particular, the time indicator module 220 determines if the current day is within the range of time included in the calendar display object, for example if it is included in the select time range, or some range around the selected time range. In response to a determination that the current day is within the range of time included in the calendar display object, a time indicator display object is generated.

As described in more detail below, the time indicator includes a time box comprising a graphical representation of a geometric object in which a numerical representation of the current time is displayed. The time indicator also can include a time bar as described in more detail below.

The time indicator 222 and calendar 212 are combined. For example, the time indicator display object is positioned on the calendar display object. As an example, the time box can be positioned at the current time and adjacent to the current day, and the time bar can be a line displayed parallel with the first axis and within the extent of the graphical representation of the current day, and positioned at the current time on the second axis. The combined time indicator 222 and calendar 212 are then displayed on display 230.

Referring now to FIG. 3, an example of a multi-day view of a calendar will now be described.

In FIG. 3, a calendar display object 300 is shown, which shows an example display for multiple days, in this case five days. An example implementation of a time indicator object is shown at 302.

In the calendar display object, a first axis 304 represents days and a second axis 306 represents time of day. In this case, the range of time includes five days, which can result from a user selecting a five day or work week view. Each day has a graphical representation 308 with an extent, e.g., 310, along the first axis. Ranges of time 312 within each day have a graphical representation 314 with an extent 316 along the second axis. Thus, in this example, each day/time range combination has a cell 318, with extents 316 and 310 in a grid. Labels for the first and second axis can be provided along the edges of the display in regions called the time well 350 and day well 352.

Events, e.g., 320, are displayed on the calendar view such that each event has a display object with an extent along the second axis corresponding to its duration in time and an extent along the first axis corresponding to the day in which the event occurs. Events may have various graphical features indicating the type of the event, whether the event is accepted, declined or tentative, and so on.

The time indicator includes a time box 330 comprising a graphical representation of a geometric object 332 in which a numerical representation 334 of the current time is displayed. The time indicator display object is positioned on the calendar display object at the current time and adjacent to the current day. In this example, the time box is contiguous with an edge of the graphical representation of the current day, and the time box is displayed outside the extent of the graphical representation of the current day. In this example, the time box is substantially centered on the current time along the second axis. In other implementations, the time box is displayed substantially outside the extent of the graphical representation of the current day.

While a portion of the time box can be displayed on the graphical representation of the current day, preferably, the time box does not obscure any event associated with the current time on the current day. Accordingly, the time box generally covers a period of time in the display of the immediately previous day. However, if any event is in that period of time in the immediately previous day, it generally does not matter to a user because that event is in the past.

The time indicator can further include a time bar 338, which is a line displayed parallel with the first axis and within the extent of the graphical representation of the current day, and positioned at the current time on the second axis. The time bar is thin (a few pixels wide) and partially transparent such that when overlaid on any event in the calendar view the bar does not obscure information about the event.

Figure 4:
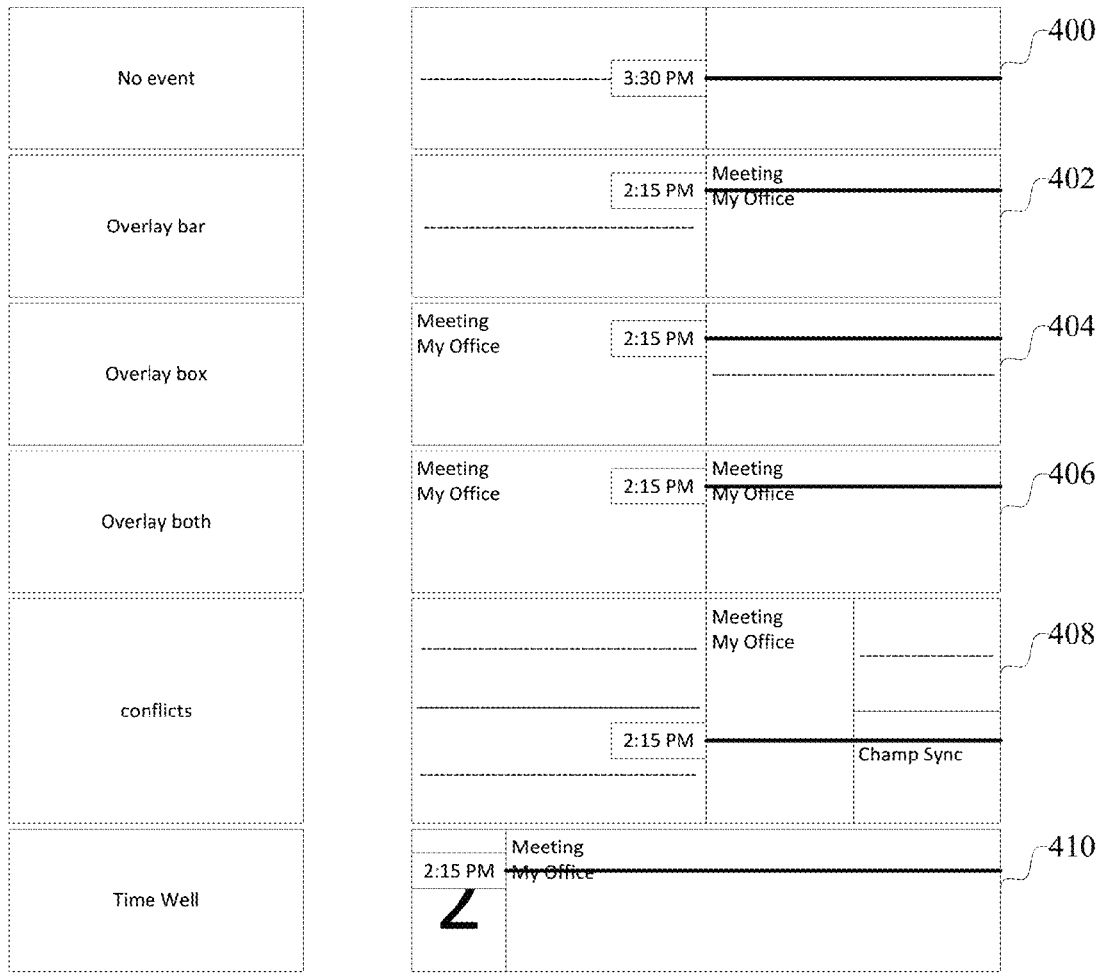
FIG. 4 is a set of example implementations for handling boundary cases for displaying a time indicator.

Referring now to FIG. 4, some behaviors of the time indicator with respect to the calendar view will now be described.

At 400, if there is no event at a current time, then the time indicator includes a time box placed at the current time on the immediately previous day but adjacent the edge of the graphical representation of the current day and a time bar placed at the current time within the extent of the current day.

At 402, an event is present at the current time on the current day. The time bar is shown as an overlay, but through which information about the event still can be read.

At 404, an event is present at the current time, but on the immediately previous day before the current day. The time box is shown on top of and partially covering the event on the previous day.

At 406, events are present on the current day and the previous day. The time box covers the event on the previous day as at 404, while the time bar overlays the event on the current day, as in 402.

At 408, two events are present on the current day. The time bar is shown to overlay the representations of both events.

At 410, if there is no previous day shown, then the time box can be displayed in the time well associated with the graphical representation of the calendar.

Some examples of additional behaviors of the time indicator, in some example implementations, are the following.

The format of the time can be shown in hours and minutes, but not seconds, to reduce the amount of space used for the time box in the time indicator. A twenty-four hour time format, or a twelve-hour time format with AM and PM shown, can be used. Animation, such as a fade from one time to the next at each minute, can be used to make a visually pleasing transition of the clock display.

When the current time is close to the start or end of a day, or close to the first or last displayed time for a day, i.e., the display boundary for a day, then the time box in the time display can be aligned with the display boundary for a day. For example, the bottom of the time box can be aligned with the bottom of the day, whereas the time bar is positioned on the current time. While the time indicator is displayed on a current day through 11:59:59 PM, at 12:00 AM, the time indicator switches to the next day.

In one implementation, the calendar display object can be rendered for a period of time that is much larger than the actual displayed period of time. For example, given a selected period of time, the rendered period of time can be ninety days before and after the selected period of time. The rendered calendar display object then can be stored in a cache, and partial views of this rendered calendar display object can be accessed more quickly, providing a smoother and more pleasing user experience.

The display of the time indicator also can be provided as a user-selectable option. For example, a user interface can be provided for the various user settings for a calendar display, and in this display, a user can select whether to show or hide the time indicator. The format of the time indicator, such as twelve or twenty-four hour format, also can be selected.

Figure 5:
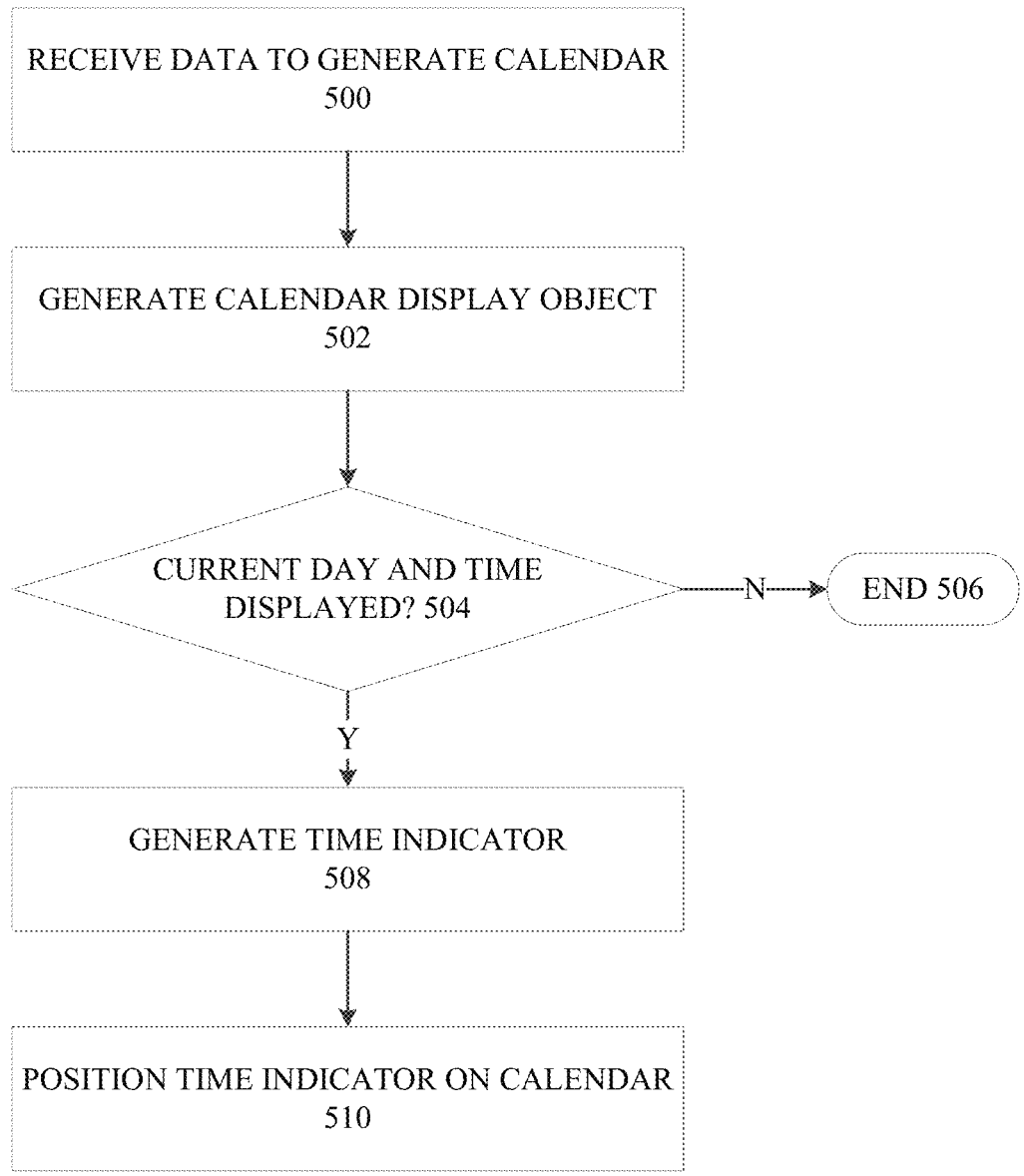
FIG. 5 is a flow chart describing an example operation of the system in FIG. 1.

Referring now to FIG. 5 a flow chart describing an example operation of the calendar view module in FIG. 2 will now be described.

In response to an instruction to display a view of a calendar, calendar information, a current day and time, and a selected range of time are received 500. A calendar display object for at least the selected range of time is generated 502. Whether the current day and time falls within the selected range of time, or the range of time for which the calendar display is actually generated, is then determined at 504. If the current day and time are not included, then processing can end at 506. Otherwise, a time indicator is generated 508. For example, a graphical object with the current time can be generated. The time indicator is positioned 510 on the calendar display object at the current time and current day.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, handheld or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
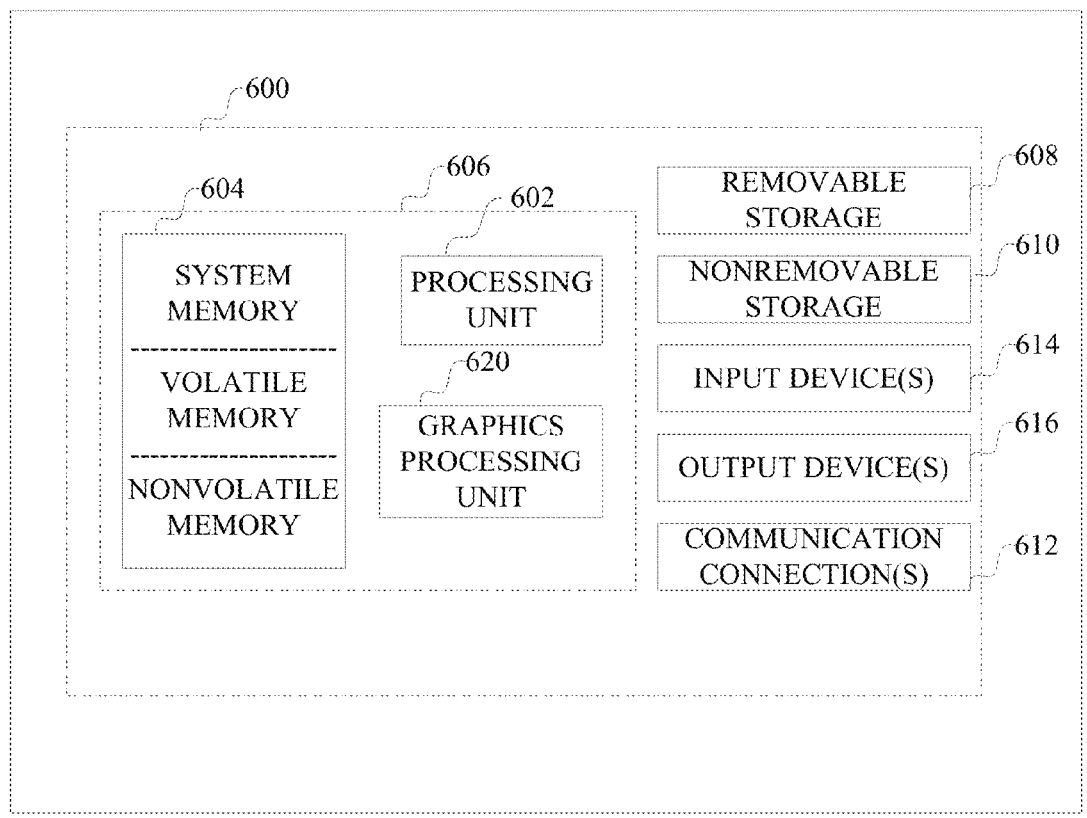
FIG. 6 is a block diagram of an example computer with which such a system can be implemented.

FIG. 6 illustrates an example of a suitable computer. This is only one example of a suitable computer and is not intended to suggest any limitation as to the scope of use or functionality of such a computer.

With reference to FIG. 6, an example computer 600, in a basic configuration, includes at least one processing unit 606 and memory 604. The computer may include multiple processing units and/or additional co-processing units such as graphics processing unit 620. Depending on the exact configuration and type of computer, memory 604 may be volatile (such as RAM), non-volatile (such as ROM, flash memory, etc.) or some combination of the two. This configuration is illustrated in FIG. 6 by dashed line 606.

Additionally, computer 600 may also have additional features/functionality. For example, computer 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 600. Any such computer storage media may be part of computer 600.

Computer 600 may also contain communications connection(s) 612 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 612 are devices that interface with the communication media to transmit data over and receive data from communication media, such as a network interface.

Computer 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system enforces licensing restrictions may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process, performed by a computer, of generating a graphical user interface for displaying a calendar on a computer, comprising:
   receiving a selected range of time of two or more days into memory;
   generating a calendar display object with a first axis representing days and a second axis representing time of day, for a range of time including at least the selected range of time, such that each day has a graphical representation with an extent along the first axis, and ranges of time within each day have a graphical representation with an extent along the second axis;
   receiving data defining a current time;
   determining if a current day is within the range of time included in the calendar display object;
   in response to a determination that the current day is within the range of time included in the calendar display object, generating a time indicator display object, the time indicator including a time box comprising a graphical representation of a geometric object in which a numerical representation of the current time is displayed, and positioning the time indicator display object on the calendar display object at the current time along the second axis and overlaying at least in part the graphical representation of a day immediately previous to the current day and adjacent to the graphical representation of the current day.

2. The computer-implemented process of claim 1, wherein the numerical representation of the current time includes hours and minutes, but not seconds.

3. The computer-implemented process of claim 2, wherein the time indicator further comprises a time bar, comprising a line displayed parallel with the first axis and within the extent of the graphical representation of the current day but not other days, and positioned at the current time on the second axis.

4. The computer-implemented process of claim 3, wherein when the current time is close to a boundary of the second axis, the time box is aligned with the boundary.

5. The computer-implemented process of claim 1, wherein the time box is contiguous with an edge of the graphical representation of the current day, and the time box is displayed outside the extent of the graphical representation of the current day.

6. The computer-implemented process of claim 1, wherein the time box is displayed substantially outside the extent of the graphical representation of the current day.

7. The article of manufacture of claim 1, wherein the numerical representation of the current time includes hours and minutes, but not seconds.

8. The article of manufacture of claim 7, wherein the time indicator further comprises a time bar, comprising a line displayed parallel with the first axis and within the extent of the graphical representation of the current day, and positioned at the current time on the second axis.

9. The article of manufacture of claim 8, wherein when the current time is close to a boundary of the second axis, the time box is aligned with the boundary.

10. The article of manufacture of claim 8, wherein the time box is substantially centered on the current time along the second axis.

11. The article of manufacture of claim 8, wherein when the current time is close to a boundary of the second axis, the time box is aligned with the boundary.

12. The article of manufacture of claim 7, wherein the time indicator further comprises a time bar, comprising a line displayed parallel with the first axis and within the extent of the graphical representation of the current day, and positioned at the current time on the second axis.

13. The article of manufacture of claim 1, wherein the numerical representation of the current time includes hours and minutes, but not seconds.

14. The computer-implemented process of claim 1, further comprising:
   in response to a determination that the current day is not within the range of time included in the calendar display object, not displaying the time indicator display object.

15. The computer-implemented process of claim 1, wherein, further in response to the determination that the current day is within the range of time included in the calendar display object, displaying the calendar display object with the generated time indicator display object.

16. An article of manufacture comprising:
   a computer storage medium;
   computer program instructions stored on the computer storage medium which, when processed by a processing device, instruct the processing device to perform a process of generating a graphical user interface for displaying a calendar on a computer, comprising:
   receiving a selected range of time of two or more days into memory;

generating a calendar display object with a first axis representing days and a second axis representing time of day, for a range of time including at least the selected range of time, such that each day has a graphical representation with an extent along the first axis, and ranges of time within each day have a graphical representation with an extent along the second axis;

receiving data defining a current time;

determining if a current day is within the range of time included in the calendar display object;

in response to a determination that the current day is within the range of time included in the calendar display object, generating a time indicator display object, the time indicator including a time box comprising a graphical representation of a geometric object in which a numerical representation of the current time is displayed, and positioning the time indicator display object on the calendar display object at the current time and adjacent to the current day.

17. The article of manufacture of claim 16, wherein the time box is contiguous with an edge of the graphical representation of the current day, and the time box is displayed outside the extent of the graphical representation of the current day.

18. The article of manufacture of claim 16, wherein the time box is displayed substantially outside the extent of the graphical representation of the current day.

19. The article of manufacture of claim 16, wherein the time box is contiguous with an edge of the graphical representation of the current day, and the time box is displayed outside the extent of the graphical representation of the current day.

20. The article of manufacture of claim 16, wherein the time box is displayed substantially outside the extent of the graphical representation of the current day.

21. A computer with a graphical user interface for displaying a calendar, comprising:

a display;

memory storing a selected range of time of two or more days, a current day and time;

a processor configured to:
generate a calendar display object with a first axis representing days and a second axis representing time of day, for a range of time including at least the selected range of time, such that each day has a graphical representation with an extent along the first axis, and ranges of time within each day have a graphical representation with an extent along the second axis;

determine if the current day is within the range of time included in the calendar display object;

in response to a determination that the current day is within the range of time included in the calendar display object, generate a time indicator display object, the time indicator including a time box comprising a graphical representation of a geometric object in which a numerical representation of the current time is displayed, and positioning the time indicator display object on the calendar display object at the current time and adjacent to the current day.

* * * * *